(12) United States Patent
Cansell

(10) Patent No.: US 6,929,752 B2
(45) Date of Patent: Aug. 16, 2005

(54) METHOD FOR TREATING WASTE BY HYDROTHERMAL OXIDATION

(75) Inventor: François Cansell, Pessac (FR)

(73) Assignee: Centre National de la Recherche Scientifique (C.N.R.S.), Paris (FR)

(*) Notice: Subject to any disclaimer, the term of this patent is extended or adjusted under 35 U.S.C. 154(b) by 43 days.

(21) Appl. No.: 10/362,675

(22) PCT Filed: Sep. 7, 2001

(86) PCT No.: PCT/FR01/02782
§ 371 (c)(1), (2), (4) Date: Feb. 24, 2003

(87) PCT Pub. No.: WO02/20414
PCT Pub. Date: Mar. 14, 2002

(65) Prior Publication Data
US 2003/0189012 A1 Oct. 9, 2003

(30) Foreign Application Priority Data
Sep. 7, 2000 (FR) .......................................... 00 11 379

(51) Int. Cl.[7] ................................................ C02F 1/72
(52) U.S. Cl. ..................... 210/752; 210/759; 210/761
(58) Field of Search ........................... 210/752, 759, 210/761, 762, 199; 422/184.1; 588/208, 226

(56) References Cited

U.S. PATENT DOCUMENTS

| 4,380,960 | A | | 4/1983 | Dickinson |
| 4,721,575 | A | | 1/1988 | Binning et al. |
| 5,252,224 | A | | 10/1993 | Kuharich et al. |
| 5,582,715 | A | | 12/1996 | McBrayer et al. |
| 5,720,889 | A | * | 2/1998 | McBrayer, Jr. et al. ..... 210/739 |
| 5,770,174 | A | | 6/1998 | Eller et al. |
| 6,475,396 | B1 | * | 11/2002 | Wofford, III et al. ....... 210/758 |

FOREIGN PATENT DOCUMENTS

| DE | 38 41 844 | 6/1990 |
| DE | 93 21 410 | 1/1998 |

* cited by examiner

Primary Examiner—Peter A. Hruskoci
(74) Attorney, Agent, or Firm—Young & Thompson

(57) ABSTRACT

A method for oxidizing organic matter contained in an aqueous effluent and an installation for implementing the method. The method comprises the following steps: injecting into a tubular body the aqueous effluent; bringing the aqueous effluent to a pressure P1, corresponding to the critical pressure of the aqueous effluent; bringing the aqueous effluent to a temperature T1; and injecting into the tubular body at n points spaced apart from one another, n fractions of at least an oxidizing composition, so that a portion of the thermal energy produced by the oxidation reaction increases the temperature of the reaction mixture from said temperature T1 to temperature T2>T1 according to an increasing curve, whereby the organic matter is oxidized, the reaction mixture continuously developing from a sub-critical liquid state to the supercritical domain.

10 Claims, 2 Drawing Sheets

METHOD FOR TREATING WASTE BY HYDROTHERMAL OXIDATION

CROSS REFERENCE TO RELATED APPLICATION

This is the 35 USC 371 national stage of international application PCT/FR01/02782 filed on Sep. 7, 2001, which designated the United States of America.

FIELD OF THE INVENTION

The present invention relates to a process for the hydrothermal oxidation of waste, in particular but not exclusively organic substances present in aqueous effluent, and to a plant intended for the implementation of said process.

Applications of the invention are in particular, but not exclusively, the conversion of the organic substances present in low amounts in aqueous effluents originating in particular from food processing industries. These aqueous effluents may also comprise dissolved salts. The organic substances are converted to gases capable of being incinerated to provide energy or to gases capable of being released into the atmosphere without danger.

BACKGROUND OF THE INVENTION

Processes for the conversion of organic waste present in an aqueous phase are known. In particular, it is known to bring the water/organic waste mixture to temperatures and pressures such that the water exceeds its critical point, thus resulting, where an oxidizing substance is present in the mixture, in the decomposition of the waste to simple chemical components of the $CO_2$ and $H_2O$ type.

However, when the water/organic waste mixture, to which amounts of oxidizing agent capable of oxidizing all the waste have been added, is compressed and heated so that the water exceeds its critical point, the oxidation reaction which takes place produces large amounts of thermal energy which can affect the integrity of the walls of the reactor in which the reaction takes place.

SUMMARY OF THE INVENTION

The same consequences with regard to the walls of the reactor are observed when the water/organic waste mixture is compressed and heated prior to the introduction of the oxidizing agent into the mixture.

On the other hand, when the oxidizing agent is introduced before having begun to compress and heat the mixture, hot spots can appear in the reactor. The latter are due essentially to the fact that the solubility of the oxidizing agent and its heat capacity are not constant according to the temperature and pressure conditions of the mixture. Thus, the concentration of oxidizing agent dissolved in the mixture is not homogeneous in the reaction medium and the oxidation reaction produces a greater amount of thermal energy in the regions with a greater concentration of oxidizing agent.

In addition to the fact that the appearance of these hot spots can affect the walls of the reactor, the poor distribution of the oxidizing agent in the reaction medium leads to a mediocre yield of the reaction for the decomposition of the organic waste.

To overcome the localized overheating of the reactor, the idea was conceived of injecting oxygen and water simultaneously and fractionwise along the reactor, so that the oxygen oxidizes the organic matter and that, simultaneously, the water lowers the temperature of the reaction medium.

However, this solution does not allow optimum decomposition of the organic matter as the oxidation rate is decreased by the simultaneous lowering of the temperature. In addition, the thermal profile of the reactor exhibits a curve which alternately increases and then decreases at each injection, which reduces the overall yield of the reactor.

A first aim of the present invention is to provide a process for the oxidation of organic compounds present in aqueous effluents which makes it possible to overcome the above-mentioned disadvantages.

This aim is achieved, in accordance with the invention, owing to the fact that the process comprises the following stages:

said aqueous effluent, comprising a predetermined amount of organic substances, taken under initial pressure and temperature conditions, is injected into a tubular body exhibiting an inlet and an outlet, said aqueous effluent is brought to a pressure P1 corresponding at least to the critical pressure of said aqueous effluent, said pressure P1 being greater than the initial pressure, said aqueous effluent is brought to a temperature T1 greater than the initial temperature by heating means applied in a zone of said tubular body, and in that n fractions of at least one oxidizing composition, the sum of which corresponds to the amount of oxidizing composition necessary for the oxidation of said predetermined amount of organic substances, are injected into said tubular body at n points spaced apart from one another, so that a portion of the thermal energy produced by the oxidation reaction increases the temperature of the reaction mixture from said temperature T1 to the temperature T2>T1 according to an increasing curve between said zone of said tubular body and the nth injection point, whereby said organic substances are oxidized, said reaction mixture continuously evolving from a subcritical liquid state to the supercritical region.

Thus, one characteristic of the process for the oxidation of the organic substances is the gradual injection of the exclusively oxidizing composition, via the n injection points, into the reaction medium flowing through the tubular body. In that way, the oxidation of the organic substances present in the aqueous effluent is carried out gradually as the reaction mixture flows through the tubular body and the thermal energy produced by the oxidation reaction at each injection of oxidizing composition is partially dissipated between the injections, which prevents excessively intense production of energy which would damage the internal walls of the tubular body. And, there is no need to inject a substance capable of simultaneously cooling the reaction medium during the reaction.

The oxidizing composition is very clearly capable of comprising other compounds which have no specific effect on the reaction medium.

A portion of the total thermal energy produced by the oxidation of all the organic substances is imparted to the reaction medium, the pressure P1 of which is greater than the critical pressure of the aqueous effluent, which allows it to gradually evolve from a subcritical state in the liquid phase up to the supercritical region, without passing through the gas phase. When the reaction mixture is in the supercritical region, the notion of phase disappears and the organic substances which were not oxidized between the injections of oxidizing composition are oxidized in this region.

Advantageously, the pressure P1 of said aqueous effluent is greater than 23 MPa and the temperature T1 of said effluent is between 370 and 520° K. In this temperature and pressure region, the aqueous effluent comprising the organic substances is in a subcritical liquid phase where a portion of these substances is oxidized.

According to a specific embodiment of the invention, said portion of thermal energy produced by the oxidation reaction increases the temperature of said reaction mixture to a temperature T2 of less than 800° K. Thus, although the temperature of the reaction mixture is capable of being greater than 800° K. after the nth injection point, since the nth fraction of oxidizing composition reacts with the remaining organic substances, this amount of energy is insufficient to damage the internal wall of the tubular body. Thus, a substantial portion of the organic substances is oxidized before the reaction mixture reaches the temperature T2 and, as the final part which is oxidized by the final fraction of oxidizing composition is low, the temperature of the reaction mixture will be very slightly greater than T2. In addition, the heat capacity of water is maximum for a temperature of between 650° K. and 700° K., which makes possible significant absorption of the thermal energy given off by the oxidation reaction in this temperature range through which the reaction medium passes. The walls of the reactor will be proportionally less affected thereby.

According to another specific embodiment of the invention, three fractions of an oxidizing composition are injected into said tubular body at three points spaced apart from one another. The first fraction is injected when the temperature of the aqueous effluent has reached the temperature T1, the second fraction is injected so that the aqueous effluent reaches the temperature T2 and, when it has reached it, the third fraction is injected.

Advantageously, the first fraction of oxidizing composition is injected after said aqueous effluent has reached the temperature T1, so that the reaction for the oxidation of the organic substances begins only downstream of said zone of said tubular body where said heating means are applied.

According to yet another specific embodiment of the invention, said tubular body exhibits a plurality of portions with cross sections of different sizes. This configuration makes it possible to alternately insert narrower portions of tubular body, in which portions the oxidizing composition is injected, and wider portions, where the oxidation reaction takes place. Thus, the residence time of the reaction mixture in the wider portions is greater, which makes it possible to increase the reaction time and thus the reaction yield between each injection of oxidizing composition.

According to an advantageous arrangement, a portion of the thermal energy produced by said oxidation is imparted to said aqueous effluent, taken under the initial pressure and temperature conditions, in order to bring it to said temperature T1. In that way, it is not necessary to provide additional heating means to bring said aqueous effluent from the initial temperature to the temperature T1, which improves the total energy balance of the process according to the invention. Only low strength initiating heating means are needed.

Preferably, the oxidizing composition injected into the tubular body is oxygen, which makes it possible to convert the organic substances at an advantageous cost. However, hydrogen peroxide can be used in certain specific situations where the costs of supplying are advantageous where when the conditions for implementing the process requires an oxidizing composition with a greater solubility in water.

According to a particularly advantageous arrangement, at least one of the fractions of oxidizing composition is composed of an oxidizing composition which is different in nature from the other fractions. Thus, for example, it is possible to benefit from the technological advantages of hydrogen peroxide, in a first part of the reactor, and from the cost advantages of oxygen, in the second part.

According to a particularly advantageous embodiment, the process in accordance with the invention additionally comprises the following stages: said aqueous effluent and the salts present therein are recovered at said outlet of said tubular body, the pressure of said aqueous effluent is lowered from said pressure P1 to a pressure P0, between atmospheric pressure and said pressure P1, so as to reduce in pressure said aqueous effluent to convert all the salts to the solid state and said aqueous effluent to the vapor state; the salts are recovered in the solid state; and said aqueous effluent is recovered in the vapor state, whereby said aqueous effluent and the salts present therein are physically separated.

A second aim of the present invention is to provide a plant intended for the implementation of the process for the oxidation of the organic substances present in aqueous effluents. The plant comprises:

means for injecting said aqueous effluent, comprising a predetermined amount of organic substances, taken under the initial pressure and temperature conditions, into a tubular body exhibiting an inlet and an outlet, means for bringing said aqueous effluent to a pressure P1 greater than the initial pressure, heating means, applied in a zone of said tubular body, for bringing said aqueous effluent to a temperature T1 greater than the initial temperature, and means for injecting n fractions of an oxidizing composition, the sum of which corresponds to the amount of oxidizing agent necessary for the oxidation of said predetermined amount of organic substances, into said tubular body, where said aqueous effluent is at least at the pressure P1, at n points spaced apart from one another, so that a portion of the thermal energy produced by the oxidation reaction increases the temperature of the reaction mixture from said temperature T1 to the temperature T2>T1 according to an increasing curve between said zone of said tubular body and the nth injection point, whereby said organic substances are oxidized, said reaction mixture continuously evolving from a subcritical phase state to a supercritical phase state.

The tubular body is advantageously composed of a tube exhibiting an inlet orifice, into which said aqueous effluent is injected, and an outlet orifice, by which said oxidized organic substances escape. Said tube can be straight, when the process can be carried out in a short tubular body, but it can also be arranged helically, so as to reduce the overall dimensions of the reactor.

Preferably, the means for injecting said aqueous effluent comprise a pump capable of compressing said aqueous effluent to a pressure of greater than 23 MPa, said pump being connected to said inlet orifice. Thus, the pump, which also comprises an orifice for entry of the aqueous effluent and an orifice for injection under pressure, injects said aqueous effluent into the tubular body. The pressure of the effluent in the tubular body is relatively constant and greater than 23 MPa, at least in the portion where the oxidation reactions take place.

Said heating means, applied in said region of said tubular body, advantageously comprise a thermoelectric generator integral with said tubular body. Thus, the thermoelectric generator attached to the tubular body makes it possible to preheat the aqueous effluent which is injected.

Said heating means, applied in said zone of said tubular body, preferably comprise a heat exchanger integral with said tubular body, the heat source of which is provided by a portion of the thermal energy produced by said oxidation reaction. This is because the oxidation reaction produces thermal energy, at least a portion of which can increase the temperature of the reaction medium and a portion of which can be recovered and used to bring the aqueous effluent to the temperature T1.

According to a specific embodiment of the invention, the means for injecting a fraction of oxidizing agent into said tubular body comprise a variable flow rate injector emerging in said tubular body, the pressure of oxidizing agent in said injector being greater than P1. The injector can be fed with oxidizing composition via a pump capable of compressing the oxidizing composition to a pressure of greater than P1 or via a tank comprising the composition under a pressure also greater than P1.

According to a specific embodiment of the invention, the means for injecting the oxidizing agent into said tubular body comprise three injectors, spaced apart from one another, emerging in said tubular body.

The first point for injection of the oxidizing composition is advantageously situated between said outlet orifice of said tubular body and said zone of said tubular body where said heating means are applied, close to this zone.

According to a specific embodiment, the oxidation plant additionally comprises: means for recovering said aqueous effluent and the salts present therein at said outlet of said tubular body, means for lowering the pressure of said aqueous effluent from said pressure P1 to a pressure P0, between atmospheric pressure and said pressure P1, so as to reduce in pressure said aqueous effluent to convert all the salts to the solid state and said aqueous effluent to the vapor state; means for recovering the salts in the solid state; and means for recovering said aqueous effluent in the vapor state, whereby said aqueous effluent and the salts present therein are physically separated.

BRIEF DESCRIPTION OF THE DRAWINGS

Other advantages and distinctive features of the invention will emerge on reading the description given below of specific embodiments of the invention, given by way of indication but without implied limitation, with reference to the appended drawings, in which.

DETAILED DESCRIPTION OF THE INVENTION

Figure 1:
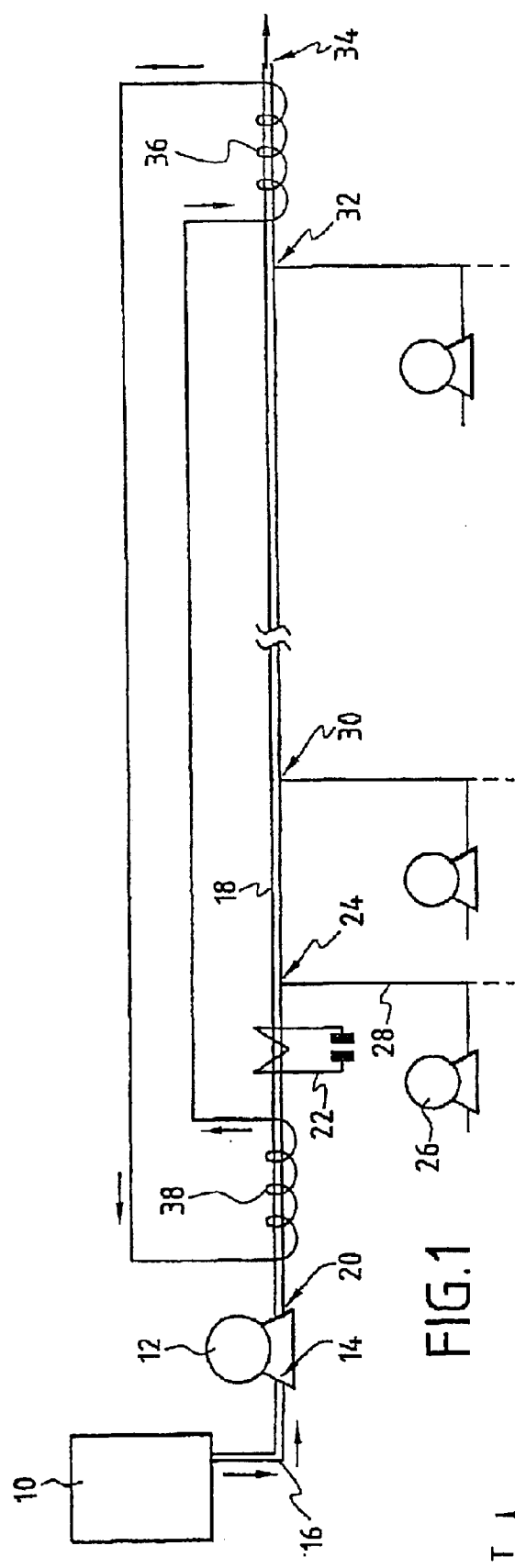
FIG. 1 is a diagrammatic view of the plant intended for the implementation of the process according to the invention, comprising n point for injection of the oxidizing composition.

Reference will be made to FIG. 1 in describing the plant for implementation of the process for the oxidation of the organic substances present in the aqueous effluent.

The aqueous effluent comprising the organic substances to be converted is stored upstream of the plant for implementation of the process in a tank 10. The aqueous effluents are generally composed of industrial or municipal sludge or of aqueous liquors resulting from industrial processes.

A pump 12, the entry orifice 14 of which is connected via a pipe 16 to the lower end of the tank 10, is capable of pumping the aqueous effluent and of injecting it under pressure into a tubular body 18 at its inlet orifice 20. The pump 12 is capable of injecting the aqueous effluent into the tubular body 18 under a pressure of greater than 22 MPa, which corresponds substantially to the critical pressure of water.

The tubular body 18 is equipped with a thermoelectric generator 22 which at least partially surrounds the external wall of the tubular body close to the inlet orifice 20 into which the aqueous effluent is injected. The thermoelectric generator 22 is composed of a heating resistor capable of producing enough thermal energy to raise the temperature of the aqueous effluent which passes through the tubular body 18.

It goes without saying that any other means capable of producing thermal energy is capable of being used, in particular means operating with gas or other fuels.

This contribution of energy to the aqueous effluent is necessary to initiate the reaction for the oxidation of the organic substances, which takes place as soon as a first fraction of oxidizing composition is injected at the injection point 24. This injection point 24 is situated in the tubular body 18 downstream of the thermoelectric generator 22. In a specific embodiment, the injection of the first fraction of oxidizing composition is carried out upstream of the heating means after the inlet orifice of the tubular body, so as to dissolve a portion of oxidizing composition in the aqueous phase at the initial temperature.

At the injection point 24, an injector (not shown) passes through the wall of the tubular body 18 and emerges in the port of the latter. The injector is connected to a pump 26 or to a tank (not shown) by means of a pipe 28. The pump 26 or the tank is capable of delivering a fraction or oxidizing composition under a pressure greater than the pressure of the moving effluent of the tubular body 18. This is because this condition is necessary for the oxidizing agent to be injected into the tubular body 18.

The oxidizing composition can be composed of any substance capable of pulling electrons from the organic substances. The least expensive oxidizing agent is oxygen and it is easy to inject it by means of an injector. Other oxidizing agents can be used, such as hydrogen peroxide or such as nitric acid, which exhibits the advantage of decomposing nitrogen oxides and of producing water and nitrogen.

A second point 30 for injection of the oxidizing composition situated close to the first injection point 24, downstream, makes possible the injection of a second fraction of the oxidizing composition. The means employed for injecting the oxidizing composition are identical to the means employed for carrying out the injection at the first point 24.

The number of fractions of oxidizing composition to be injected into the tubular body 18 can be varied as a function of the concentration of organic substances present in the aqueous effluent and of the amount of oxidizing agent necessary for the oxidation of all the organic substances and as a function of the geometry of the tubular body. A specific embodiment of the invention in which the plant comprises three points for injection of oxidizing composition will be described in more detail in the continuation of the description.

According to an advantageous arrangement, when the temperature of the reaction medium is increased after the injection of the first fraction of oxidizing agent, at least two types of oxidizing composition are used. Hydrogen peroxide is injected first, due to its high oxidizing power, and then oxygen fractions are injected into the other injection points. The reaction having begun, oxygen can react in an optimum fashion. According to this embodiment, the cost balance of the reactor is improved as oxygen is less expensive than hydrogen peroxide.

In accordance with FIG. 1, the plant comprises a final point 32 for injection of the oxidizing composition, known as the nth injection point.

In order for the oxidation reaction to be substantially complete, that is to say for all the organic substances to have oxidized, it is necessary for the amount of oxidizing agent injected into the aqueous effluent to be at least equal to the amounts of oxidizing agent corresponding to the stoichiometry of the reaction for the oxidation of the organic substances. Thus, the sum of the fractions of oxidizing composition injected into the tubular body 18 is at least equal to the stoichiometric amount of oxidizing agent for the reaction for the oxidation of a given amount of aqueous effluent. Very clearly, the oxidative process takes place continuously and the reasoning which is applied for given amounts can be transposed to the continuous operation by using measurements of flow rates.

When the reaction is complete and when the organic substances comprise only compounds based on carbon and on oxygen, the oxidation products are composed of carbon dioxide and of water. These oxidation products are released at the end of the tubular body 18 at an outlet orifice 34.

The process according to the invention makes it possible to convert to inorganic compounds an organic load present in an aqueous effluent, for example to produce water and carbon dioxide. In this case, the reaction products can certainly be released to the atmosphere without damage to the environment or can be recovered in order to be used as reactant, if the content of carbon dioxide is sufficient.

The products from the reaction for the oxidation of the organic substances can also be released to the atmosphere if, for example, they comprise nitrogen resulting from the decomposition of nitrogen oxide by nitric acid. On the other hand, if the organic substances comprise chlorine, the hydrogen chloride originating from the reaction will have to be recovered by chemical conversion.

As will be described in more detail in the continuation of the description, the tubular body is a priori at its maximum temperature in the zone situated after the nth injection point. Thus, it is possible to recover this thermal energy by means of a first exchanger 36 situated in said zone where the temperature is at a maximum in order to transfer it upstream of the tubular body 18 by means of a second exchanger 38. This thermal energy, transferred close to the inlet orifice 20 of the tubular body 18, makes it possible to supplement or to replace the thermoelectric generator necessary for the preheating of the aqueous effluent. This configuration is of economic advantage in that it reduces the amount of energy necessary for the implementation of the process.

Figure 2:
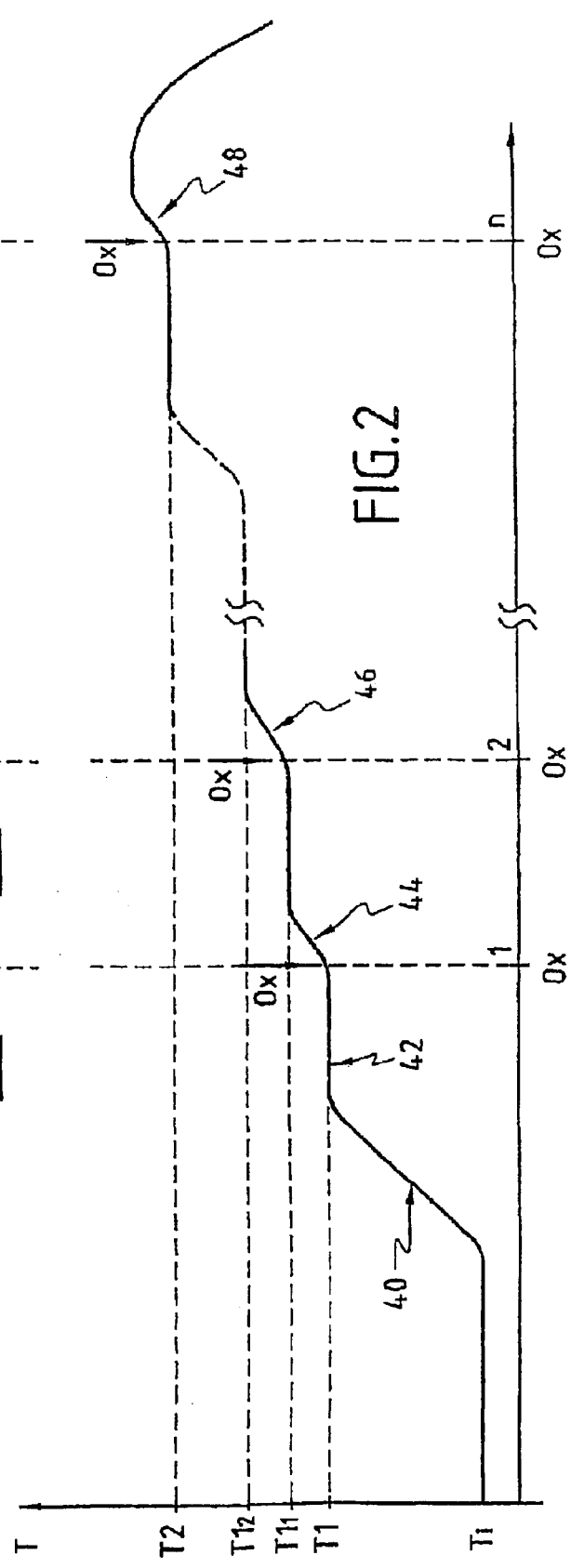
FIG. 2 is a view of the thermal profile of the reaction media as a function of the points for injection of oxidizing composition corresponding to the diagrammatic view of FIG. 1.

After having described the constituent components of the plant necessary for the implementation of the process in accordance with the invention with reference to FIG. 1, the process for the oxidation of the organic substances present in the effluent and the thermal profile of the reaction media will now be described with reference to FIG. 2. This figure is situated straight below the device of FIG. 1 in order for the thermal profile of the reaction medium to correspond to the various portions of the tubular reactor 18.

The aqueous effluent is first of all compressed by means of the pump 12 before being injected under a pressure of greater than 22 MPa into the inlet orifice 20 of the tubular body 18. The compression, which makes it possible to raise the temperature of the aqueous effluent, is supplemented by the second heat exchanger 38, if the plant is under normal operating conditions, or by the thermoelectric generator 22, if the plant is in a transient state. The reaction medium, initially at the temperature Ti, is thus brought to the temperature T1 along a slope 40 in accordance with the thermal profile of FIG. 2.

The temperature T1 is between 370 and 520° K., while the pressure of the reaction medium is kept constant, which makes it possible to retain the reaction medium in the liquid phase. The reaction medium retains a constant temperature T1 for a transient period corresponding to the plateau 42.

Subsequently, a first fraction of the oxidizing composition is injected at the first injection point 24 and the temperature of the reaction medium increases according to the slope 44 to reach the temperature $T1_1$. This is because the oxidation of the organic substances by the oxidizing composition is exothermic and, consequently, imparts energy to the reaction medium.

A second fraction of the oxidizing composition is injected at the second injection point 30, producing energy capable of increasing the temperature to a value $T1_2$ according to the slope 46.

The same operation is repeated as many times as necessary, taking care to restrain the temperature of the reaction medium by the controlled injection of the fractions of oxidizing composition.

Before the injection of the nth fraction of oxidizing agent into the tubular body 18 at the injection point 32, the temperature of the reaction medium must not be greater than the temperature T2, which is lower than 800° K. This is because, in the contrary case, the risks of damage to the internal wall of the tubular body 18 are great, since the nth and final injection further increases the temperature of the reaction medium according to a slope 48.

The final injection of oxidizing composition makes possible the decomposition of the organic substances of the aqueous effluents which were not decomposed during the preceding stages. In order to ensure a maximum yield of the oxidation reaction, the sum of the n fractions of oxidizing composition is substantially greater than the stoichiometric amount necessary. Very clearly, as the process is continuous, it is the sum of the flow rates of the fraction of oxidizing composition with respect to the flow rate of the aqueous effluent in the tubular body 18 which corresponds to a greater than stoichiometric ratio.

Furthermore, as the heat capacity of water is at a maximum for a temperature substantially equal to 670° K., a large fraction of oxidizing composition is advantageously injected within a temperature range for the reaction medium comprising this value of 670° K. This is because, since the heat capacity of water is at a maximum at this value of the temperature, the thermal energy produced by the oxidation reaction is so much better absorbed, which restricts the increase in the temperature of the reaction media and thus the damage to the internal wall of the tubular body 18.

In addition, when the oxidizing composition is oxygen, it is soluble in the liquid phase of the aqueous effluent for all the injections. This advantageous distinctive feature makes it possible to avoid hot spots in the tubular body. This is because the complete solubility of the oxygen in the reaction medium makes possible a homogeneous and instantaneous distribution of the oxidizing agent, which produces an increase in temperature throughout the reaction medium since the reactions begin substantially at the same time. Conversely, poor solubility of the oxidizing agent leads to localized reactions in the reaction media and therefore to hot spots.

Figure 3:
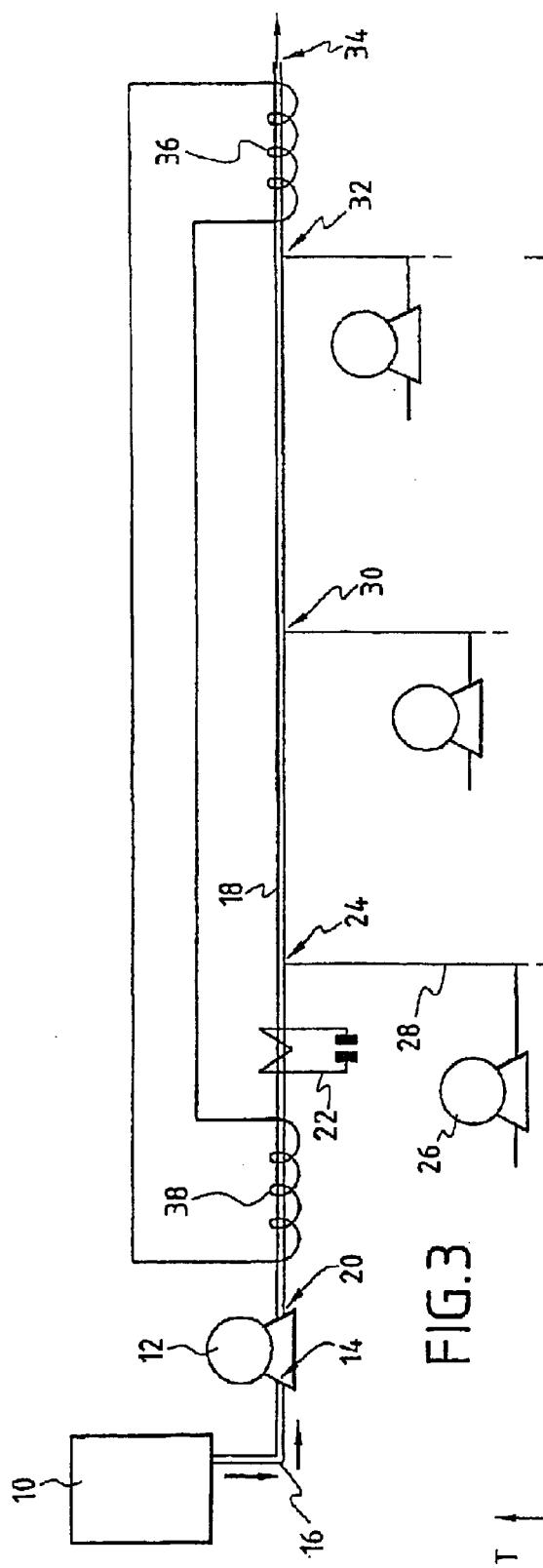
FIG. 3 is a diagrammatic view of the plant intended for the implementation of the process in accordance with the invention according to a specific embodiment where tubular body comprises three injection points.
Figure 4:
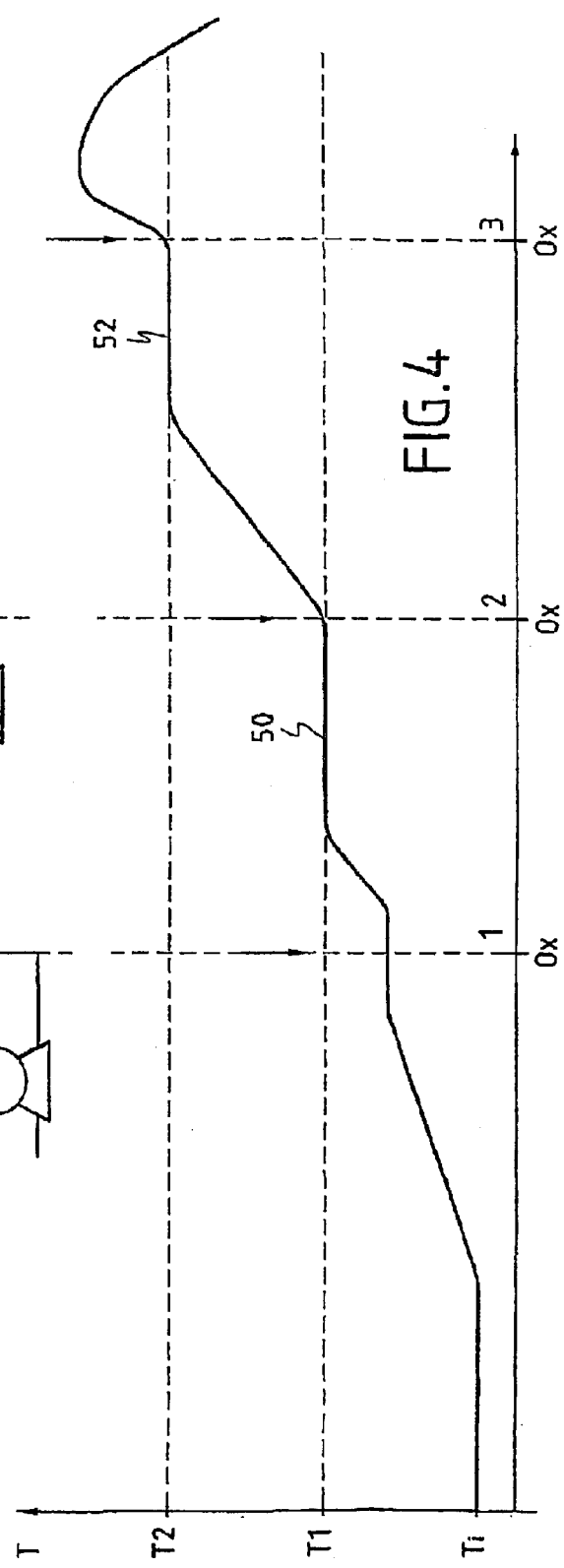
FIG. 4 is a view of the thermal profile of the reaction media as a function of the injection points corresponding to the diagrammatic view of the plant represented in FIG. 3.

Reference will be made to FIGS. 3 and 4 in describing a specific embodiment comprising three injection points for three fractions of oxidizing composition.

The plant in accordance with the invention and the thermal profile which is associated with it are found in FIGS. 3 and 4. The aqueous effluent is injected under pressure through the inlet orifice 20. The preheating means and the injection of the first fraction of oxidizing composition at the injection point 24 allow the reaction medium to reach the temperature T1 for a transient period corresponding to the plateau 50. The injection of the second fraction of oxidizing composition at the injection point 30 produces an increase in the temperature to a value T2 corresponding to the plateau 52. Subsequently, the final injection, which makes possible the oxidation of the organic substances which have not yet reacted, raises the temperature of the reaction medium to a temperature substantially greater than T2. Very clearly, the values of T1 and T2 are in this instance the same as the values T1 and T2 mentioned in FIGS. 1 and 2.

According to another specific embodiment, which is not shown, while retaining the principle described above according to which three fractions of oxidizing agent are injected, the injection of the first fraction is carried out at an injection point situated in the tubular body upstream of the preheating means close to the inlet orifice of the tubular body. Thus, the oxidizing composition constitutes, with the aqueous effluent comprising the organic substances, a reaction medium with a temperature substantially equal to the initial temperature of the aqueous effluent. The preheating means allow the oxidation reaction to begin from the first rise in temperature of the reaction medium, which is itself produced by the reaction.

According to a further embodiment, not shown, only two fractions of oxidizing composition are injected. This configuration is advantageous when the concentration of organic substances in the aqueous effluent is low.

A specific example of the implementation of the invention is given by way of indication in the description which will follow.

The reactor or tubular body comprises four injection points and a preheater which allows the temperature of the aqueous effluent to be brought to a temperature of 425° K.

The effluent to be treated is composed of a mixture of glucose and methanol comprising 3.9% by weight of glucose and 4.9% of methanol in an aqueous phase. To completely oxidize this mixture, the amount of oxygen necessary is 88.9 g/l. This amount is known as the "chemical oxygen demand" or more usually COD. The amount injected in this instance corresponds to a stoichiometry of 1.1.

The flow rate of the effluent in the reactor is 1 kg/hour at a pressure of 25 MPa.

The table represented below comprises the measurement of the length of the reactor in meters, the point 0 being substantially the point of injection of the aqueous effluent, the position of the injections of the oxygen fractions and the corresponding temperature of the reactor.

| Oxygen flow rates in g/l | Position in meters | Temperature in ° K. |
|---|---|---|
|  | 0 | 298 |
|  | 3 | 425 |
| 18 | 4 | 423 |
|  | 5 | 477 |
| 25 | 6 | 525 |
|  | 7 | 570 |
| 25 | 8 | 633 |
|  | 9 | 650 |
| 25 | 10 | 679 |
|  | 11 | 695 |
|  | 12 | 825 |
|  | 13 | 854 |
|  | 14 | 849 |
|  | 16 | 792 |

The example above is in no way limiting and it would not be departing from the scope of the invention to treat any other effluent composition with a different oxidizing agent and by means of a plant comprising a different number of injection points.

According to another aspect, the oxidation plant comprises means, not shown, for recovering the salts present in the aqueous effluents.

Thus, the tubular body is extended at its outlet by a second tubular body into which the aqueous effluent and the salts present therein flow at a temperature of between 750 and 900° K., for example 820° K. The second tubular body comprises an inlet nozzle into which water can be injected to cool the aqueous effluent to a temperature of between 700 and 800° K., for example 750° K.

The second tubular body emerges in a hopper-forming receptacle through a pressure-reducing nozzle. The internal pressure of the receptacle being between atmospheric pressure and said pressure P1, for example 1 MPa. In that way, the aqueous effluent comprising the salts is reduced in pressure, all the salts are converted to a solid state and the aqueous effluent is converted to the vapor state. The salts can thus be recovered at the lower end of the hopper and the vapor at another outlet inserted for this purpose at a temperature of between 500 and 600° K., for example 550° K.

In addition, in a particularly advantageous way, the outlet of the tubular body and/or the second tubular body comprises an ultrasound cleaning device, applied to the external walls, which makes it possible to clean away the salts which sediment on the internal wall of the tubular bodies and which present a risk of blocking the tubular bodies during the oxidation process.

What is claimed is:

1. A process for the oxidation of organic substances present in an aqueous effluent, said aqueous effluent being capable of comprising salts, the process comprising the following stages:

injecting said aqueous effluent having an initial pressure and temperature, and comprising a predetermined amount of organic substances, into a tubular body having an inlet and an outlet;

bringing said aqueous effluent to a pressure P1 corresponding at least to the critical pressure of said aqueous effluent, said pressure P1 being greater than the initial pressure;

bringing said aqueous effluent to a temperature T1 greater than the initial temperature with heating means applied in a zone of said tubular body;

injecting into said tubular body at n points spaced apart from one another, n fractions of at least one oxidizing composition, whose sum corresponds to the amount of oxidizing composition necessary for the oxidation of said predetermined amount of organic substances, so that a portion of the thermal energy produced by the oxidation reaction increases the temperature of the reaction mixture from said temperature T1 to a temperature T2 which is greater than T1 according to an increasing curve between said zone of said tubular body and the nth injection point, whereby said organic substances are oxidized, said reaction mixture continuously evolving from a subcritical liquid state to the supercritical region; and wherein said process is implemented without injecting a substance capable of simultaneously cooling the reaction medium during the oxidation reaction.

2. The oxidation process according to claim 1, wherein said pressure P1 of said aqueous effluent is greater than 23 MPa and the temperature T1 of said effluent is between 370 and 520° K.

3. The oxidation process according to claim 1, wherein the portion of thermal energy produced by the oxidation reaction increases the temperature of said reaction mixture to a temperature T2 of less than 800° K.

4. The oxidation process according to claim 1, wherein three fractions of an oxidizing composition are injected into said tubular body at three points spaced apart from one another.

5. The oxidation process according to claim 1, wherein the first fraction of oxidizing composition is injected after said aqueous effluent has reached the temperature T1.

6. The oxidation process according to claim 1, further comprising imparting a portion of the thermal energy produced by said oxidation to said aqueous effluent in order to bring said aqueous effluent to said temperature T1.

7. The oxidation process according to claim 1, wherein the oxidizing composition is oxygen.

8. The oxidation process according to claim 1, wherein the oxidizing composition is hydrogen peroxide.

9. The oxidation process according to claim 1, wherein at least one of the fractions of oxidizing composition is composed of an oxidizing composition which is different in nature from the other fractions.

10. The oxidation process according to claim 1, further comprising the following stages:
recovering said aqueous effluent and the salts present therein at the outlet of the tubular body;
lowering the pressure of said aqueous effluent from said pressure P1 to a pressure P0, ranging between atmospheric pressure and said pressure P1, so as to convert all the salts to the solid state and said aqueous effluent to the vapor state;
recovering the salts in the solid state; and
recovering said aqueous effluent in the vapor state, whereby said aqueous effluent and the salts present therein are physically separated.

* * * * *